United States Patent [19]

Assaf et al.

[11] 4,377,071
[45] Mar. 22, 1983

[54] SOLAR ENERGY POWER STATION

[75] Inventors: Gad Assaf; Lucien Y. Bronicki, both of Rehovot, Israel

[73] Assignee: Solmat Systems, Ltd., Yavne, Israel

[21] Appl. No.: 174,843

[22] Filed: Aug. 4, 1980

[51] Int. Cl.³ .............................................. F03G 7/02
[52] U.S. Cl. ................................. 60/641.8; 60/641.1; 126/415
[58] Field of Search ................ 60/641.1, 641.6, 641.8; 126/415, 416, 436

[56] References Cited

U.S. PATENT DOCUMENTS 4,063,419 12/1977 Garrett .............................. 60/641.8
4,328,788 5/1982 Wirguin et al. ..................... 126/415

FOREIGN PATENT DOCUMENTS 2819946 12/1978 Fed. Rep. of Germany ..... 60/641.8

Primary Examiner—Allen M. Ostrager
Assistant Examiner—Stephen F. Husar
Attorney, Agent, or Firm—Sandler & Greenblum

[57] ABSTRACT

A solar power station has a heat source in the form of the heat storage layer of a solar pond, a heat sink in the form of the wind-mixed layer of the pond covering the halocline interposed between the heat storage layer and the wind-mixed layer, and a power plant associated therewith. The power plant includes a boiler responsive to water from the heat storage layer for vaporizing a working fluid, a prime mover for producing work by extracting heat from vaporized working fluid, and a condenser cooled by water from a cooling pond connected to the solar pond such that only water in the wind-mixed layer is exchanged with the cooling pond. The wind-mixed layer serves to dissipate heat from the condenser and the volume of water in the cooling pond increase the heat absorption capacity of the heat sink.

21 Claims, 4 Drawing Figures

SOLAR ENERGY POWER STATION

TECHNICAL FIELD

This invention relates to a power station of the type having a solar pond as a heat source.

BACKGROUND OF INVENTION

Proposals have been made to construct a solar energy power station by providing a collector in the form of a solar pond, the lower layer of which fuctions as a heat storage zone. A solar pond is a body of water whose upper part is constituted by a halocline which is a layer of water 1 to 2 meters deep having a salinity profile that increases monotonically with depth. When the profile is sufficiently steep, a temperature rise in an underlying stratum of the halocline due to absorption of solar radiation does not decrease the density of this layer relative to the density of the overlying stratum in the halocline sufficiently to effect an exchange of brine between the two layers. Thus, convection in the halocline due to temperature differences is suppressed; and the halocline absorbs solar radiation developing a temperature profile that matches the salinity profile.

Below the halocline is a layer whose salinity is uniform and equal to the salinity at the bottom of the halocline. In many cases, this layer is six meters or more in depth and heat from the halocline is absorbed by this layer due to conduction across the interface. The depth of the heated layer, termed the heat storage layer, depends on the rate of heat input from the halocline due to solar absorption, the rate of heat loss to the ground containing the solar pond, and the rate of heat extracted from the heat storage layer. The temperature of the heat storage layer often will reach 80-90 degrees Celcius and will be uniform throughout the layer by reason of convection currents established by the extraction of heat from this layer. The halocline above the heat storage layer serves, not only as an absorber of solar radiation which inputs heat to the heat storage layer, but as an insulator that effectively insulates the heat storage layer from conductive heat loss to the ambient environment above the halocline.

By reason of environmental conditions of wind and perhaps precipitation, the halocline is covered by a layer of water of uniform salinity equal to the salinity at the top of the halocline. This upper layer is conventionally termed the wind-mixed layer of the solar pond and is convective. In an actual solar pond, the temperature of the wind-mixed layer will generally be a few degrees Celcius above ambient temperature, heat absorbed in this layer serving to establish convection currents that dissipate such heat to the ambient environment. As is well known, the halocline can be stabilized against diffusion of salt and wind mixing by expedients which produce a falling, a rising, or a standing pond.

In a power station in which the heat storage layer of the solar pond is the heat source, proposals have been made to use the wind-mixed layer, as the heat sink. The thermal head involved in such a construction may range from 40-60 degrees Celcius and a suitable power plant for utilizing such a relatively small thermal head is a closed, Rankine cycle power plant utilizing an organic fluid such as Freon as a working fluid. Such a power plant is disclosed in U.S. Pat. No. 3,393,515, and comprises a boiler in the form of a heat exchanger through which brine from the heat storage layer is pumped for vaporizing the working fluid, a prime mover such as a turbine to which the vaporized working fluid is applied, and a condenser, also in the form of a heat exchanger, into one side of which the turbine exhausts. The condenser is cooled by water from the wind-mixed layer, and condensate in the condenser is returned by a pump to the boiler. A power station, operating from a low grade heat source, is hereinafter referred to as a power station of the type described.

The work generated by the heat engine of the prime mover (in this example, a turbine) per unit mass flow of brine from the heat storage layer passed through the boiler will depend on the thermal head of the system, i.e., on the difference between the temperature of the hot brine entering the boiler, and the temperature of the wind-mixed layer. By reason of the absorption of solar radiation by the wind-mixed layer during daylight hours, and heat conducted into the wind-mixed layer, taken together with environmental conditions of wind and ambient temperature, as well as variations in the load imposed on the turbine, the temperature of the wind-mixed layer will have a diurnal fluctuation. During the early afternoon, when the sun is hottest, the wind-mixed layer will have a temperature some 4 to 5 degrees Celcius higher than the twelve hours earlier when the night is coolest and radiation cooling of the wind-mixed layer is maximized. On the other hand, the temperature variation of the heat storage layer in the same two periods of time will vary by a much smaller amount, say one degree Celcius with the result that the power plant is less efficient during hot, daylight hours of operation than during cool, night hours. Obviously, this is not a desirable situation.

It is therefore an object of the present invention to provide a new and improved solar energy power station of the type described wherein diurnal variations in efficiency are significantly reduced.

BRIEF DESCRIPTION OF THE INVENTION

In accordance with the present invention, diurnal variations in efficiency are suppressed by providing an auxiliary cooling pond containing water of the same salinity as the wind-mixed layer, exchanging water between the auxiliary pond and the wind-mixed layer, and cooling the condenser with water from the cooling pond. Water in the cooling pond is heated by its contact with the condenser to a temperature that exceeds the temperature of the wind-mixed layer; the heated water is exchanged with cooler water from the wind-mixed layer and heated water in the wind-mixed is cooled by heat transfer to the environment.

In one embodiment of the invention, the cooling pond is connected to the solar pond by a gate of a size functionally related to the area of the solar pond. In such case, a two-layer flow regime exists in the gate effecting an exchange of water between the wind-mixed layer and the cooling pond. The lower layer in the flow regime is water from the wind-mixed layer which is cooler and more dense than water from the cooling pond which has been heated by contact with the condenser; and this layer flows from the solar pond into the cooling pond. The upper layer is the water heated by the condenser; it is relatively warmer and hence less dense than the lower layer, and flows from the cooling pond into the solar pond. This embodiment is thus a passive system supported by a form of thermosyphonic action that effects an exchange of water between the cooling pond and the wind-mixed layer.

The relatively warm water produced by the heat exchange action of the condenser, flows through the gate into the solar pond and spreads throughout the wind-mixed layer pond by reason of convection currents therein. The warm water eventually is cooled by a heat transfer process in which the heat is dissipated into the ambient environment.

Shortly after midnight, when the ambient environment reaches its lowest temperature, the temperature of the water in the cooling pond will reach its minimum level. In the late afternoon, the temperature of the water in the cooling pond will reach its maximum level. The capacity of the volume of water in the cooling pond to absorb heat will increase the heat absorption capacity of the wind-mixed layer and thus suppressing the usual temperature rise in the wind-mixed layer during daylight operation. By arranging for the cooling pond to have a volume of about 0.1 cubic meters per square meter of surface area of the solar pond, optimum suppression of the change in the thermal head on the power plant as between daytime and night-time operation will be achieved. Consequently, the efficiency during the day will be substantially the same as the efficiency during the night.

In a second embodiment of the invention, an active system for effecting the exchange of water between the cooling pond and the solar pond is utilized. In such case, water from the cooling pond is pumped into the wind-mixed layer of the solar pond during the cooler portion of the night whereby the coldest water in the system will be in the cooling pond by the time the sun rises. Water from the cooling pond is continuously pumped through the condenser and then discharged into the wind-mixed layer. The outlet for the cooling water from the condenser is preferably provided with a by-pass valve which permits selectively bypassing the cooling pond and returning all or a portion of the cooling water directly to the cooling pond. During the day, when the prime mover is functioning to satisfy peak demand and the volume discharged through the condenser is a maximum, injection of condenser cooling water directly into the wind-mixed layer of the solar pond may not be possible without excessive turbulence. In such case, the by-pass valve is opened and this problem is avoided.

Because the second embodiment of the invention involves pumping to effect an exchange between the cooling pond and the wind-mixed layer, it becomes possible to filter the water taking part in the exchange in order to eliminate material held in suspension in the water. For example, dust and other particulate material, both organic and inorganic, can be windblown into the solar pond as well as the cooling pond; and such material can adversely affect the ability of the solar pond to act as a collector. Therefore, in a modification of the second embodiment, water exchanged between the ponds is passed through a filter to remove particulates. In still a further modification, brine exchanged between the boiler and the heat storage layer can also be filtered if particulates settle, or microbial contaminates develop in the heat storage layer. In the latter case, suitable bacterialcides can be injected into the filter stage when needed. Likewise, algae or other microorganism that develop in the wind-mixed layer can also be controlled by injecting controlling chemicals into the filter associated with the wind-layer.

BRIEF DESCRIPTION OF DRAWINGS

Embodiments of the present invention are shown in the accompanying drawings wherein.

BEST MODE OF CARRYING OUT THE INVENTION

Figure 1:
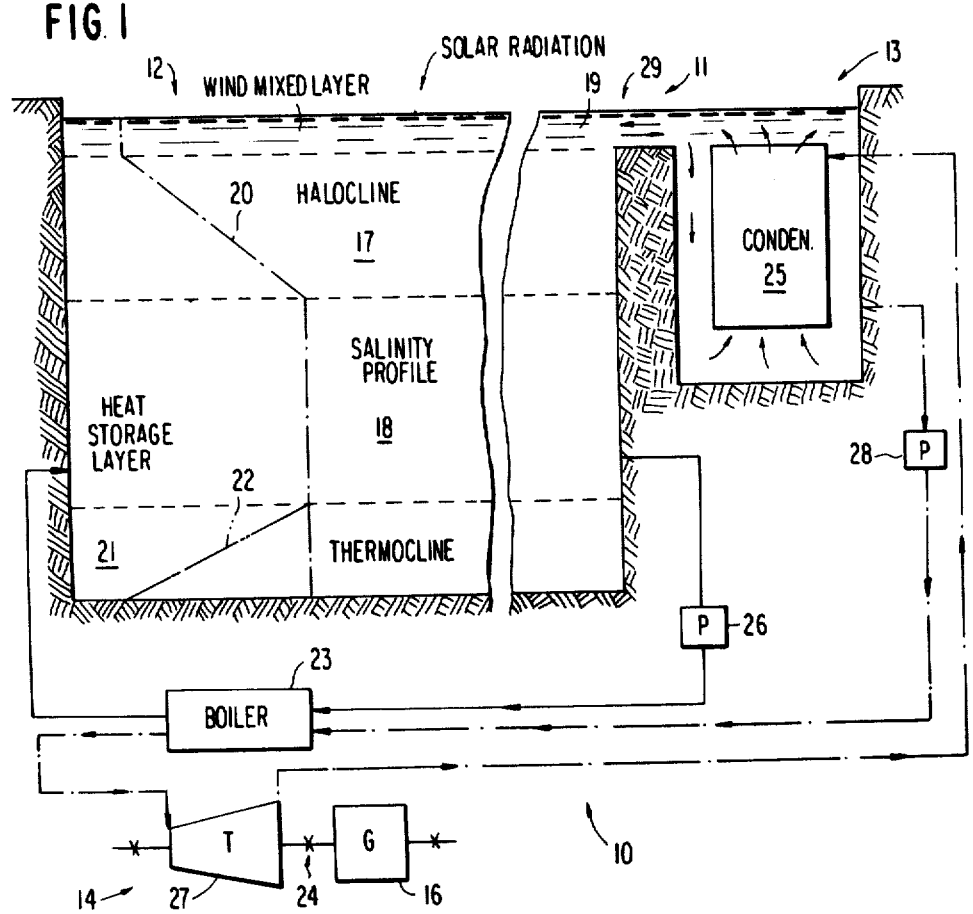
FIG. 1 is a block diagram of a power station showing a first embodiment of the present invention utilizing a passive technique for effecting the exchange of water between the cooling pond and the solar pond.

Referring now to FIG. 1, reference numeral 10 designates a power station of the type described into which the first embodiment 11 of the present invention is incorporated. Power station 10 comprises solar pond 12, auxiliary cooling pond 13, and power plant 14.

Solar pond 12 is conventional and includes a body of water contained in excavation 15 having halocline 17 interposed between a lower heat storage layer 18 and an upper wind-mixed layer 19 at the surface of the pond exposed to the ambient environment. The area of the solar pond is in the thousands of square meters and, for the embodiment shown in FIG. 1, an area of 10,000 square meters is contemplated.

Wind-mixed layer 19 is 15–30 centimeters deep with a uniform salinity of say 3–4%. Halocline 17 is from 1–2 meters deep with a salinity which increases monotonically from say 3–4% to say 25–30%. The water below the halocline is 6 meters deep or more depending upon the amount of heat to be stored in the solar pond. The salinity in the layer below the halocline is uniform and the salinity profile throughout the depth of the pond is indicated by reference numeral 20.

Solar energy incident on the solar pond is absorbed in the wind-mixed layer and in the halocline. Because the wind-mixed layer is convective, currents are set up in the wind-mixed layer which transfer the heat to the surface of the pond where it is dissipated to the environment. Consequently, the temperature in the wind-mixed layer is close to ambient temperature.

Halocline 17 also absorbs heat and, by reason of the non-convective nature of this layer, the temperature in this layer increase monotonically with depth. Heat from the halocline is transferred by conduction through the interface between the halocline and the layer of water directly therebeneath heating the underlying layer of water. After a period of time depending upon the rate at which heat is extracted from the solar pond and the rate at which solar radiation is absorbed by the pond, heat storage layer 18 is established which will have a substantial uniform temperature. The layer of water 21 below the heat storage layer and adjacent the bottom of excavation 15 conducts heat from the heat storage layer into the ground, such heat constituting a loss for the solar pond. However, the heat conductivity of water is relatively low with the result that only a fraction of the heat contained in the heat storage layer is lost in this manner.

Layer 21, which lies below the heat storage layer, is termed the thermocline in that a temperature gradient exists as indicated by reference numeral 22. Thus, solar pond 12 is a conventional pond well known in the prior art. As is known in the prior art, various expedients can be followed for stabilizing the halocline against diffusion of salt and against erosion from above due to wind mixing. Such expedients can establish the pond as a rising, falling, or standing solar pond. Thus, long term stability of the halocline can be achieved, and the heat storage layer can provide the heat source for power plant 14.

Power plant 14 includes boiler 23, prime mover 24, and condenser 25. While the power plant shown is a closed Rankine cycle type, other types of heat engines can be used for the production of power. For convenience, the remainder of this description refers to a closed cycle system that operates on the Rankine cycle, but the invention is applicable to other systems.

Boiler 23 is essentially a heat exchanger through which hot brine from the heat storage layer is circulated via pump 26. The hot brine passing through the heat exchanger heats an organic working fluid, such as Freon, vaporizing the same. The vaporized working fluid is piped to the inlet of prime mover 24 which is in the form of turbine 27 producing work represented by the output of generator 16. The vaporized working fluid expands in the turbine and the exhaust vapors are piped to condenser 25 which is immersed in cooling pond 13. The vapors condense in condensor 25 and, by reason of pump 28, the condensate is pumped back into boiler 23 whereby the cycle described above is repeated.

Cooling pond 13 is separated from solar pond 12 by gate 29 which has a depth no greater than the minimum depth of the wind-mixed layer. The essential idea is for an exchange of water to take place between the wind-mixed layer of the solar pond and the cooling pond. For this reason, the water in the cooling pond is of the same salinity as the salinity in the wind-mixed layer. The size of the gate is functionally related to the area of the solar pond as indicated below. It can be shown that the flow in the gate will be critical with respect to the internal Fround correlations (see the article by Anati, Assaf and Thompson entitled "Laboratory Models of Sea Straits", 1977). This is to say, a two-layer flow regime will exist in gate 29 for effecting an exchange of water between the wind-mixed layer and the cooling pond. The lower layer in the flow regime is constituted by cooler and more dense water from the wind-mixed layer of the solar pond, the direction of flow being into the cooling pond. The upper layer of water is constitued by the discharge of cooling water from the condenser. It is is relatively warmer and less dense than the lower layer, and flows from the cooling pond into the solar pond. The cooler water entering the cooling pond flows toward the bottom thereof; and the water at the botom flows upwardly through the heat exchange coils of the condenser emerging from the top as shown by the arrows in FIG. 1. The difference in de sities of the water in the cooling pond sets up a thermosyphonic action that eliminates the use of pumping power.

The relatively warm water flowing through the gate into the solar pond spreads throughout the pond by reason of convection currents that exist in the wind-mixed layer. Eventually the heat is dissipated to the atmosphere at the interface between the wind-mixed layer and the atmosphere. Thus, a cycle is established wherein water in the cooling pond is heated by its contact with the condenser to a temperature exceeding the temperature of the wind-mixed layer. The heated water is exchanged with cooler water from the wind-mixed layer; and heated water in the wind-mixed layer is cooled by heat transfer to the environment.

Figure 2:
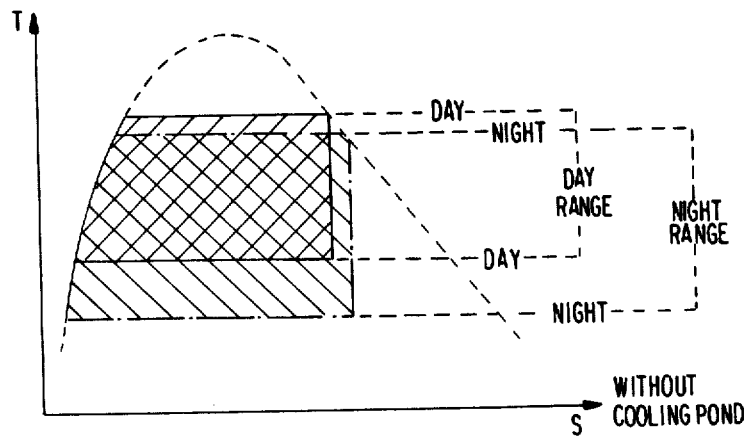
FIG. 2 is a temperature-entropy diagram in schematic form for a typical organic working fluid utilized in a closed, Rankine cycle power plant of the type described showing the difference between daytime and night-time operation.

In a conventional power station of the type described where the wind-mixed layer is utilized as a source of cooling water for the condenser without the provision of cooling pond 13, the efficiency of the power station is significantly different at night than during the day. The difference arises because the temperature of the wind-mixed layer will rise by 4-5 degrees during the daylight hours as compared to night-time temperature while the temperature of the heat storage layer will increase by only about 1 degree. The effect of these temperature changes on the amount of work produced by the prime mover and on the efficiency of the power station can be seen by referring to FIG. 2 which is a temperature-entrophy diagram for a typical organic fluid such as Freon. The curve in the solid lines in FIG. 2 represents the change in state of the working fluid during a cycle during the daytime. During night-time, the temperature of the heat source will decrease by a significantly smaller amount than the temperature of the heat sink. As a consequence, the change in state of the working fluid during the night-time, which is shown in the chain lines in FIG. 2, will be significantly different. As can be seen from inspection, both work output and efficiency during daytime operation will be significantly smaller than during night-time operation.

In the present invention illustrated in FIG. 1, where diurnal temperature changes occur, the ambient environment will reach its lowest temperature shortly after midnight. When this occurs, the temperature of the water in the cooling pond will reach its minimum level. That is to say, heat will be dissipated rapidly by the wind-mixed layer with the result that the coolest water in the system will be located at the bottom of the cooling pond. During early daylight, as ambient temperature increases, the water at the bottom of the cooling pond will increase in temperature until by the late afternoon, the temperature of the water in the cooling pond will reach its maximum level. However, the heat absorption capacity of the volume of water in the cooling pond when added to the heat absorption capacity of the wind-mixed layer will be adequate to suppress the temperature rise in the wind-mixed layer during daylight hours. Optimum suppression of the change in thermal head on the power plant as between daytime and night-time operation can be achieved by arranging for the volume of the cooling pond to be about 0.1 cubic meters per square meter of surface area of the solar pond. When this is done, the efficiency of the power station during the day will be substantially the same as the efficiency during the night.

As indicated above, the size of gate 29 is related to the cooling rate of the condenser and to the design temperature difference between the surface of the solar pond and a discharge flowing through the gate through the upper layer. It can be shown that the width B of the gate is given as follows:

$$B = [2H^2 A^2]/[h^3 \rho^2 C_p^2 \Delta T^3 g \alpha \eta] \quad (1)$$

where H is the rate at which energy is extracted from the pond in watts per square meter of pond area, A is the area of the solar pond in square meters, h is the depth of the gate in meters, $\rho$ is the density of the water in the cooling pond in kilograms per cubic meter, $C_p$ is the specific heat of water in joules per kilogram, $\Delta T$ is the assigned temperature difference between the surface of the pond and the discharge from the condenser, g is the gravitational constant and $\alpha_T$ is the temperature density relationship $(1/\rho)/(d\rho/dT)$ with dimensions of reciprocal degrees Celcius.

For a solar pond in which the depth of the gate is 0.15 meters, $\Delta T$ is 5 degrees, Celcius, and energy is extracted from the pond at the rate of about 50 watts per square meter of pond area, the width of the gate is $4.3 \times 10^{-4}$ A meters. For a relatively small pond of 1500 square meters, the width of the gate will be 0.64 meters.

Figure 3:
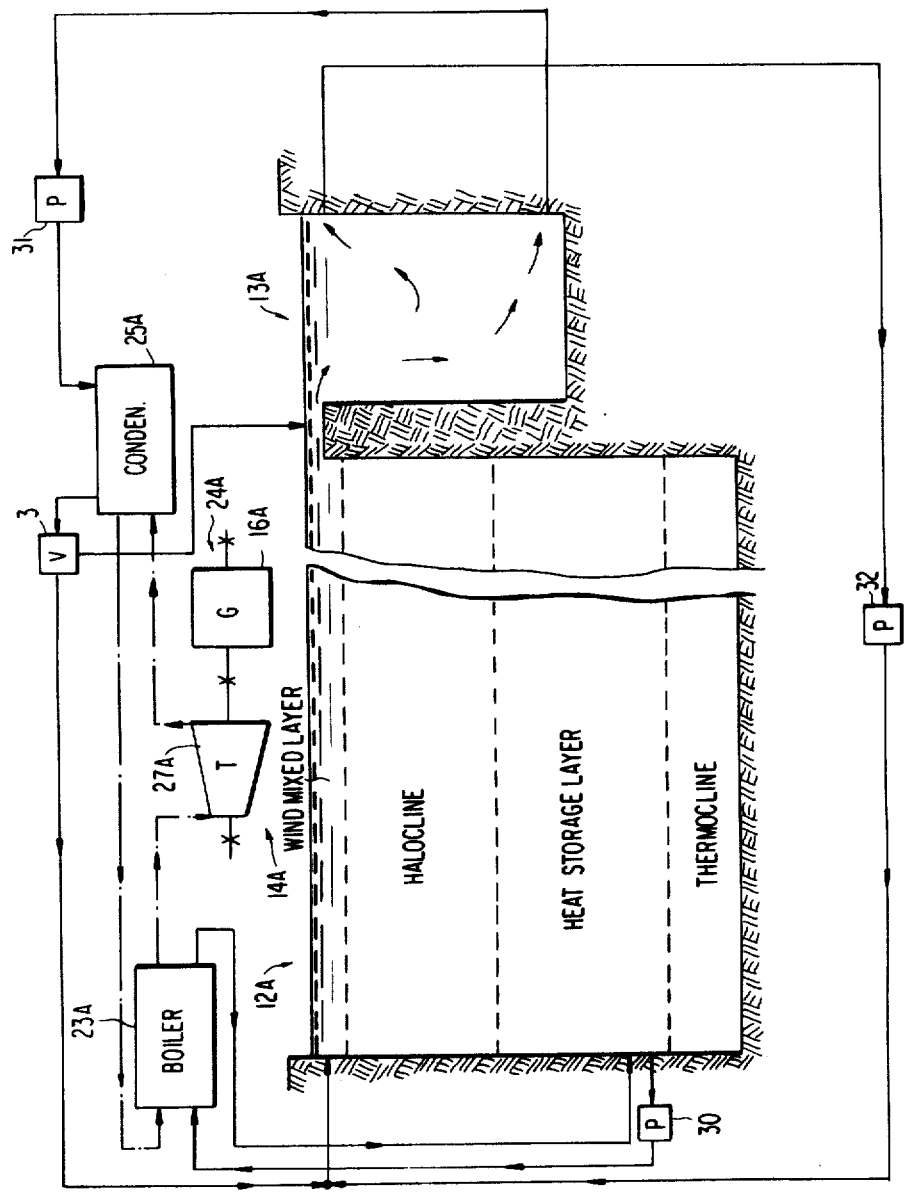
FIG. 3 is a schematic of a power station showing a second embodiment of the present invention in which pumps are utilized for the purpose of effecting the exchange of water between the cooling pond and the solar pond.

In the embodiment of the invention described, the exchange of water between the cooling pond and the wind-mixed layer does not require any external work input. In the embodiment shown in FIG. 3, an active system is utilized for the purpose of exchanging water between the cooling pond and the solar pond. This arrangement is suitable for ponds larger than 10,000 square meters. Referring now to FIG. 3, the power station includes solar pond 12A, cooling pond 13A and power plant 14A. The power plant comprises boiler 23A, prime mover 24A and condenser 25A.

In operation, pump 30 pumps hot brine from the heat storage layer into boiler 23A for the purpose of heating an organic fluid such as Freon to a vapor which is applied turbine 27A of the prime mover where expansion of the vapor takes place producing work in the form of an output from generator 16A. Vapor exhausted from the turbine is applied to condenser 25A where the vapor is condensed and then pumped back into boiler 23A for repeating the cycle. Cooling water for the condenser is extracted near the bottom of cooling pond 13A by pump 31. After passing through condenser 25A, the water passes through selectively operable valve 32 and, usually, is discharged into the wind-mixed layer of the solar pond. A suitable diffuser (not shown) is provided to minimize turbulence in the wind-mixed layer as a result of the discharge and prevent the halocline from being disturbed.

The diurnal cycle of the system provides for the operation of pump 32 during the night-time hours, say from midnight through the early morning for transferring the warmest water in the cooling pond into the wind-mixed layer miximizing heat dissipation to the environment. Thus, in the early daylight hours, the cooling pond will be filled with the coldest water in the system. After pump 32 is shut down, the only transfer of water between the cooling pond and the wind-mixed layer takes place via pump 31.

When the prime mover is furnishing peak loads, probably during the peak heat of the daylight hours, the volume flow of cooling water through condenser 25A may be so large that it is not possible to inject all of this water into the wind-mixed layer without disturbing the halocline. In such case, valve 32 is operated for the purpose of bypassing some or all of the water passed by the condenser into the cooling pond directly.

Figure 4:
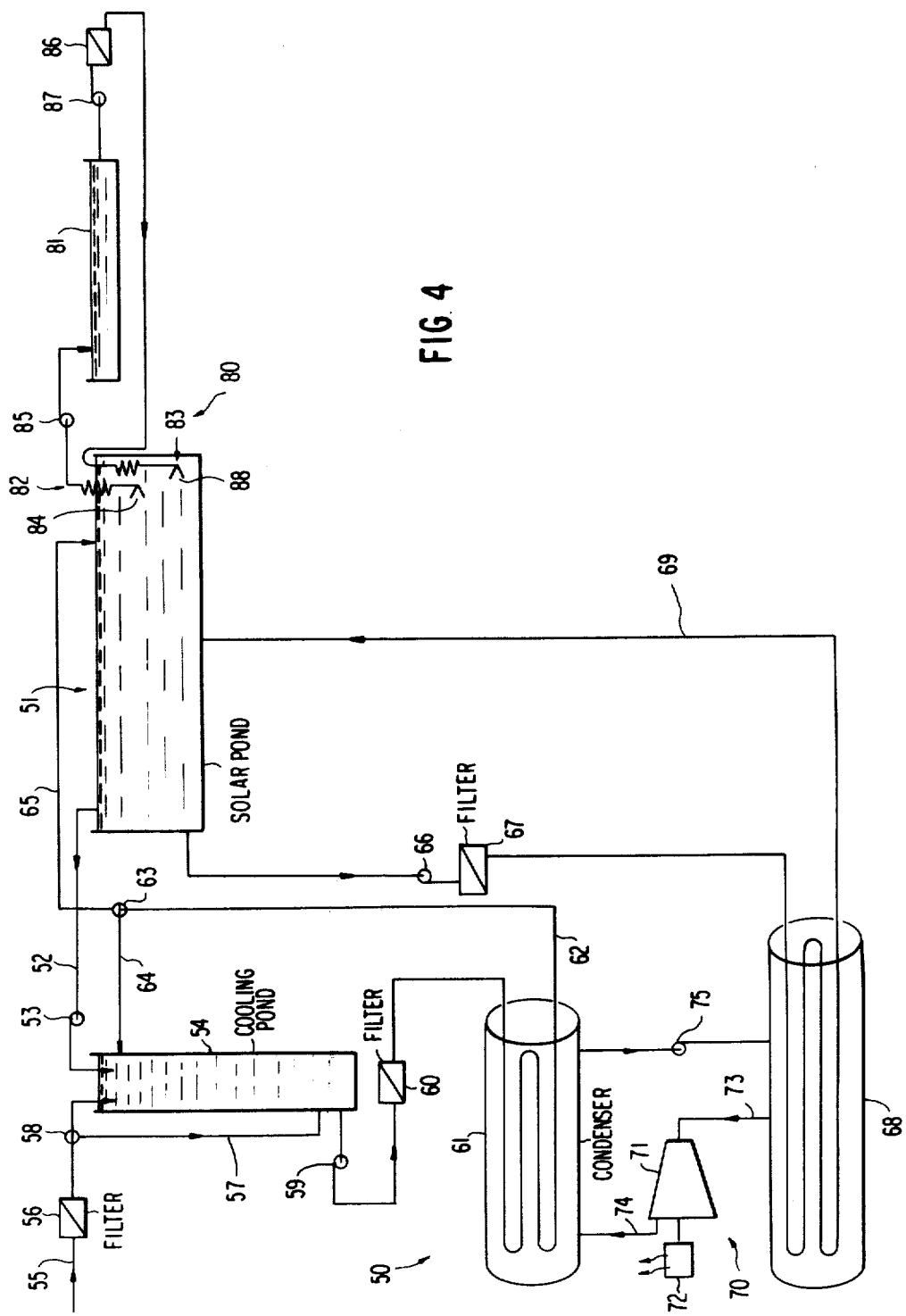
FIG. 4 is a schematic showing of a power plant according to the second embodiment of the invention incorporating filters in the exchange paths.

Refering now to FIG. 4, reference numeral 50 designates a closed, Rankine cycle power plant incorporating filters that selectively clean the liquid exchanged between the heat storage layer and the boiler. Solar pond 51 contains the usual wind-mixed layer, halocline and heat storage layers. Conduit 52 opening into the wind-mixed layer supplies surface water to pump 53 which discharges into cooling pond 54. Make-up water for the ponds (to account for evaporation not compensated for by presipitation) from pipe 55 is selectively added to cooling pond 54, as needed, through filter 56, bypass line 57 serving to admit the make-up water to the bottom of the cooling pond if necessary by selective operation of by-pass valve 58.

Cold water from the bottom of the cooling pond is passed by pump 59 through filter 60 into the cooling coils of condenser 61. After condensing the vaporized working fluid, the cooling water is discharged via line 62 into selector valve 63 which can be set to discharge the cooling water into the top of the cooling pond via pipe 64 or into the wind-mixed layer of the solar pond via pipe 65.

Hot brine from the heat storage layer of the solar pond is passed by pump 66 through filter 67 into the heating coils of boiler 68. After vaporizing the working fluid in the boiler, the cooled brine is discharged into the bottom of the heat storage layer via pipe 69.

Prime mover 70 of the power plant includes turbine 71 driving generator 72 for producing power. Vaporized working fluid generated in boiler 68 flows into the turbine via line 73 where it expands producing work. The vapor exhausted from the turbine is passed to condenser 61 via line 74. Condensate in the condenser is returned to the boiler via pump 75.

Particulate material, such as sand and organic material, blown into the surface water of the cooling and solar ponds is removed by the action of filter 60. This filter also removes biological material that tends to grow in nutrient rich water constituting the wind-mixed layer. Particulate and biological material in the wind-mixed layer may adversely affect the absorption characteristics of the solar pond by increasing tubidity, etc. Filter 60 will control this situation and provides a way in which chemicals can be added to the wind-mixed layer to combat adverse biological activity such as bacteria that produce blooms which cast shadows in the pond. Injection of chemicals via pump 59 for this purpose can be done intermittently as needed by monitoring the water flowing through the filter.

While the halocline cannot by disturbed, the water in the heat storage layer is continuously exchanged with the boiler and filter 67 is effective to remove particles that enter the pond at the surface and have a mass that causes them to sink through the halocline. Chemicals can also be added to the heat storage layer at pump 66 if biological activity in this layer warrants.

Finally, the water in the halocline itself can be filtered by mechanism 80 which exchanges one stratum of liquid at a time in the halocline. Mechanism 80 comprises pond 81, which acts as a settling pond for large sized particles in the solar pond, intake means 82, discharge means 83, and associated water transport means. Intake means 82 includes intake diffuser 84, whose level in the halocline is selectively controlled by a suitable lifting arrangement (not shown), and pump 85 by which water, of a given salinity from a preselected layer of the halocline, is drawn from the halocline and discharged into pond 81. The pumping process is a slow one to minimize turbulence in the halocline; and heavy particles in the water flowing in pond 81 settle out. The remainder of particulate material in the water is removed by filter 86 through which return pump 87 transfers water in pond 81 to discharge means 83. The latter includes discharge diffuser 88 whose level is adjusted to match the level of the intake diffuser but spatially displaced.

By operating the pumps 85,87 for a period of time adequate to completely withdraw and replace a preselected layer of water in the halocline determined by the depth of the intake and discharge diffusers, particulate material suspended in such layer can be filtered and removed. By following this procedure, the entire halocline can be filtered, layer by layer.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

We claim:

1. In a solar energy power station of the type having a solar pond with a halocline interposed between a lower heat storage layer and an upper wind-mixed layer at the surface of the pond exposed to an ambient environment, and a power plant having a boiler responsive to water from the heat storage layer for vaporizing a working fluid, a prime mover for producing work by extracting heat from the vaporized working fluid, and a condenser for condensing the working fluid exhausted from the prime mover before returning the condensate to the boiler, the method comprising:
   (a) providing an auxiliary cooling pond containing water of the same salinity as but cooler than the wind-mixed layer;
   (b) cooling the condenser with water from the cooling pond; and
   (c) exchanging water between the auxiliary pond and the wind-mixed layer.

2. The method of claim 1 wherein the exchange of water between the wind-mixed layer and the cooling pond takes place without pumping.

3. The method of claim 2 wherein only the wind-mixed layer of the solar pond is connected to the cooling pond.

4. The method of claim 3 wherein a gate connects the wind-mixed layer to the cooling pond such that a two-layer flow regime in the gate effects the exchange between the wind-mixed layer and the cooling pond.

5. The method of claim 4 wherein the gate is of predetermined size functionally related to the area of the solar pond.

6. The method of claim 5 wherein the volume of the cooling pond is about 0.1 cubic meters per square meter of surface area of the solar pond.

7. A solar energy power station comprising:
   (a) a solar pond having a halocline interposed between a lower heat storage layer and an upper wind-mixed layer at the surface of the halocline exposed to the ambient environment;
   (b) an auxiliary cooling pond containing water of the same salinity as the wind-mixed layer;
   (c) means for effecting an exchange of water between the cooling pond and only the wind-mixed layer of the solar pond;
   (d) a power plant including a boiler for adding heat to a working fluid; a prime mover for extracting heat from working fluid heated by the boiler and producing work; and a condenser for absorbing heat from the working fluid exhausted from the prime mover before returning the working fluid to the boiler;
   (e) means for furnishing water from the heat storage layer to the boiler; and
   (f) means for furnishing water from the cooling pond to the condenser.

8. A solar energy power station according to claim 7 wherein the means for effecting an exchange of water includes a gate connecting the wind-mixed layer to the cooling pond.

9. A solar energy power station according to claim 8 wherein the gate is such that a two-layer flow regime takes place through the gate.

10. A solar energy power station according to claim 9 wherein the volume of the cooling pond is about 0.1 cubic meters per square meter of surface area of the pond.

11. A solar energy power station according to claim 9 wherein the condenser is immersed in the cooling pond.

12. A solar energy power station according to claim 7 including a primary pump for selectively pumping water from near the bottom of the cooling pond into the wind-mixed layer of the solar pond.

13. A solar energy power station according to claim 12 including a secondary pump for selectively pumping water from the cooling pond through the condenser and into the wind-mixed layer of the solar pond.

14. A solar energy power station according to claim 13 including a selectively operable by-pass valve for directing water that has passed through the condenser into the cooling pond near the top thereof and bypassing the wind-mixed layer.

15. A method for using the power station according to claim 12 including the steps of:
   (a) operating the primary pump during the night when the ambient environment is relatively cool whereby the cooling pond is filled with relatively cool water; and
   (b) terminating the primary pump during the day when the ambient environment is relatively hot.

16. A method according to claim 15 including the step of selectively operating a valve while the work output of the prime mover is at a peak.

17. A solar energy power station according to claim 7 including means for exchanging water in the pond through a filter.

18. The combination of claim 17 wherein the water that is exchanged is the water in the wind-mixed layer.

19. The combination of claim 17 wherein the water that is exchanged is the water in the halocline.

20. The combination of claim 19 wherein the water from the heat storage layer furnished to the boiler passes through a filter.

21. The combination of claim 17 wherein the power plant is a closed Rankine cycle power plant.

* * * * *